(12) United States Patent
Ren et al.

(10) Patent No.: US 12,356,263 B2
(45) Date of Patent: Jul. 8, 2025

(54) CONTINUOUS CONNECTION FOR A SINGLE FREQUENCY NETWORK

(71) Applicant: QUALCOMM Incorporated, San Diego, CA (US)

(72) Inventors: Yuwei Ren, Beijing (CN); Huilin Xu, Temecula, CA (US); Ruifeng Ma, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/757,287

(22) PCT Filed: Dec. 31, 2019

(86) PCT No.: PCT/CN2019/130331
§ 371 (c)(1),
(2) Date: Jun. 13, 2022

(87) PCT Pub. No.: WO2021/134400
PCT Pub. Date: Jul. 8, 2021

(65) Prior Publication Data
US 2023/0017551 A1    Jan. 19, 2023

(51) Int. Cl.
*H04W 36/00*    (2009.01)
*H04W 36/32*    (2009.01)
*H04W 56/00*    (2009.01)

(52) U.S. Cl.
CPC . *H04W 36/0085* (2018.08); *H04W 36/00837* (2018.08); *H04W 56/0055* (2013.01); *H04W 36/322* (2023.05)

(58) Field of Classification Search
CPC ....... H04W 36/0085; H04W 36/00837; H04W 56/0055; H04W 36/322; H04W 56/001;
(Continued)

(56) References Cited

U.S. PATENT DOCUMENTS

2017/0171792 A1    6/2017  Axmon et al.
2017/0238141 A1*   8/2017  Lindoff .............. H04B 7/0834
                                                      455/456.5
(Continued)

FOREIGN PATENT DOCUMENTS

CN    108476057 A    8/2018
WO    2010121418 A1  10/2010
(Continued)

OTHER PUBLICATIONS

WO 2020/091576 A1 (Year: 2020).*
(Continued)

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a user equipment (UE) may determine a measurement of a wireless signal from a first base station of a network, the measurement including one or more of: a Doppler shift of the wireless signal or an angular variation of the wireless signal; determine that a high speed train or tunneling (HSTT) event has occurred based at least in part on the measurement; provide, to the first base station, an indication that the HSTT event has occurred; and receive, from the first base station, configuration information to: configure the UE for a handover to a second base station of the network, configure the UE for beam switching, or cause the UE to change a connection state. Numerous other aspects are provided.

35 Claims, 11 Drawing Sheets

(58) Field of Classification Search
CPC .............. H04W 56/0035; G01S 13/524; G01S 5/0205; G01S 5/12; H04B 7/0619; H04B 7/0617
See application file for complete search history.

(56) References Cited

U.S. PATENT DOCUMENTS

| | | |
|---|---|---|
| 2017/0295596 A1 | 10/2017 | Chen et al. |
| 2018/0049078 A1 | 2/2018 | Yang et al. |
| 2018/0067203 A1* | 3/2018 | Lee ..................... H04B 7/0619 |
| 2018/0191416 A1 | 7/2018 | Palenius et al. |
| 2021/0376894 A1* | 12/2021 | Cha ..................... H04B 7/0695 |

FOREIGN PATENT DOCUMENTS

| | | |
|---|---|---|
| WO | 2014053660 A1 | 4/2014 |
| WO | 2017167918 A1 | 10/2017 |
| WO | 2018184150 A1 | 10/2018 |

OTHER PUBLICATIONS

CMCC: "Ad Hoc Minutes for R16 NR HST Demodulation", 3GPP TSG-RAN WG4 Meeting #93, R4-1915868, Reno, USA, Nov. 18-22, 2019, pp. 1-37, The whole document.

International Search Report and Written Opinion—PCT/CN2019/130331—ISA/EPO—Sep. 27, 2020.

Supplementary European Search Report—EP19958666—Search Authority—The Hague—Aug. 21, 2023.

* cited by examiner

CONTINUOUS CONNECTION FOR A SINGLE FREQUENCY NETWORK

CROSS-REFERENCE TO RELATED APPLICATION

This application is a 35 U.S.C. § 371 U.S. national stage entry of International Application PCT/CN2019/130331, having an international filing date of Dec. 31, 2019, entitled "CONTINUOUS CONNECTION FOR A SINGLE FREQUENCY NETWORK," which is hereby expressly incorporated by reference herein.

FIELD OF THE DISCLOSURE

Aspects of the present disclosure generally relate to wireless communication and to techniques and apparatuses for continuous connection for a single frequency network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, by the UE, a measurement of a wireless signal from a first base station of a network, the measurement comprising one or more of: a Doppler shift of the wireless signal, or an angular variation of the wireless signal; determining, by the UE, that a high speed train or tunneling (HSTT) event has occurred based at least in part on one or more of: the Doppler shift satisfying a Doppler shift threshold, or the angular variation satisfying an angular variation threshold; providing, by the UE and to the first base station, an indication that the HSTT event has occurred; and receiving, by the UE and from the first base station, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a method of wireless communication, performed by a first base station of a network, may include receiving, by the first base station and from a UE, an indication that an HSTT event has occurred; and providing, by the first base station and to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a method of wireless communication, performed by a first base station of a network, may include determining, by the first base station, that an HSTT event has occurred based at least in part on one or more of: satisfaction of a Doppler shift threshold by a Doppler shift measurement, by the first base station, of a wireless signal provided by a UE, satisfaction of an angular variation threshold by an angular variation measurement, by the first base station, of the wireless signal provided by the UE, or a position of the UE; and providing, by the first base station and to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a UE for wireless communication may include memory and one or more processors operatively coupled to the memory. The memory and the one or more processors may be configured to determine, by the UE, a measurement of a wireless signal from a first base station of a network, the measurement comprising one or more of: a Doppler shift of the wireless signal, or an angular variation of the wireless signal; determine, by the UE, that an HSTT event has occurred based at least in part on one or more of: the Doppler shift satisfying a Doppler shift threshold, or the angular variation satisfying an angular variation threshold; provide, by the UE and to the first base station, an indication that the HSTT event has occurred; and receive, by the UE and from the first base station, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a base station for wireless communication may include memory and one or more processors operatively coupled to the memory. The memory and the one or more processors may be configured to receive, by the first base station and from a UE, an indication that an HSTT event has occurred; and provide, by the first base station and to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a base station for wireless communication may include memory and one or more processors operatively coupled to the memory. The memory and the one or more processors may be configured to determine that an HSTT event has occurred based at least in part on one or more of: satisfaction of a Doppler shift threshold by a Doppler shift measurement, by the first base station, of a wireless signal provided by UE, satisfaction of an angular variation threshold by an angular variation measurement, by the first base station, of the wireless signal provided by the UE, or a position of the UE; and provide, to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a non-transitory computer-readable medium may store one or more instructions for wireless communication. The one or more instructions, when executed by one or more processors of a UE, may cause the one or more processors to: determine a measurement of a wireless signal from a first base station of a network, the measurement comprising one or more of: a Doppler shift of the wireless signal, or an angular variation of the wireless signal; determine that an HSTT event has occurred based at least in part on one or more of: the Doppler shift satisfying a Doppler shift threshold, or the angular variation satisfying an angular variation threshold; provide, to the first base station, an indication that the HSTT event has occurred; and receive, from the first base station, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a non-transitory computer-readable medium may store one or more instructions for wireless communication. The one or more instructions, when executed by one or more processors of a base station, may cause the one or more processors to: receive, from a UE, an indication that an HSTT event has occurred; and provide, to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, a non-transitory computer-readable medium may store one or more instructions for wireless communication. The one or more instructions, when executed by one or more processors of a base station, may cause the one or more processors to: determine that an HSTT event has occurred based at least in part on one or more of: satisfaction of a Doppler shift threshold by a Doppler shift measurement, by the first base station, of a wireless signal provided by a UE, satisfaction of an angular variation threshold by an angular variation measurement, by the first base station, of the wireless signal provided by the UE, or a position of the UE; and provide, to the UE, configuration information to: configure the UE for a handover to a second base station of the network based at least in part on the HSTT event, configure the UE for beam switching based at least in part on the HSTT event, or cause the UE to change a connection state based at least in part on the HSTT event.

In some aspects, an apparatus for wireless communication may include means for determining a measurement of a wireless signal from a first base station of a network, the measurement comprising one or more of: a Doppler shift of the wireless signal, or an angular variation of the wireless signal; means for determining that an HSTT event has occurred based at least in part on one or more of: the Doppler shift satisfying a Doppler shift threshold, or the angular variation satisfying an angular variation threshold; means for providing, to the first base station, an indication that the HSTT event has occurred; and means for receiving, from the first base station, configuration information to: configure the apparatus for a handover to a second base station of the network based at least in part on the HSTT event, configure the apparatus for beam switching based at least in part on the HSTT event, or cause the apparatus to change a connection state based at least in part on the HSTT event.

In some aspects, an apparatus for wireless communication may include means for receiving, from a UE, an indication that an HSTT event has occurred; and means for providing, to the UE, configuration information to: configure the UE for a handover to a base station of a network based at least in part on the HSTT event, configure the UE for beam switching based at least in part on the HSTT event, or cause the UE to change a connection state based at least in part on the HSTT event.

In some aspects, an apparatus for wireless communication may include means for determining that an HSTT event has occurred based at least in part on one or more of: satisfaction of a Doppler shift threshold by a Doppler shift measurement, by the apparatus, of a wireless signal provided by a UE, satisfaction of an angular variation threshold by an angular variation measurement, by the apparatus, of the wireless signal provided by the UE, or a position of the UE; and means for providing, to the UE, configuration information to: configure the UE for a handover to a base station based at least in part on the HSTT event, configure the UE for beam switching based at least in part on the HSTT event, or cause the UE to change a connection state based at least in part on the HSTT event.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
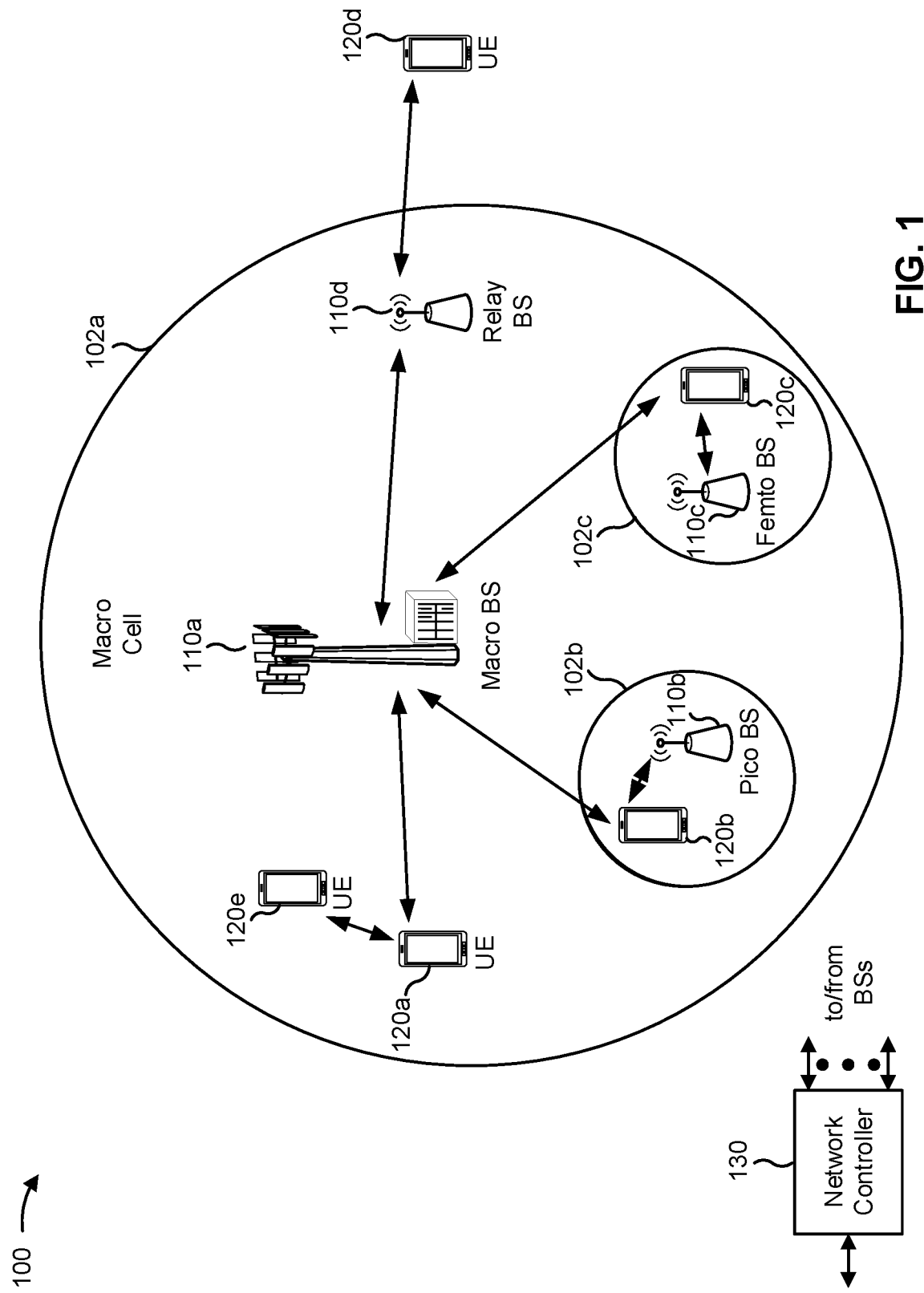
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
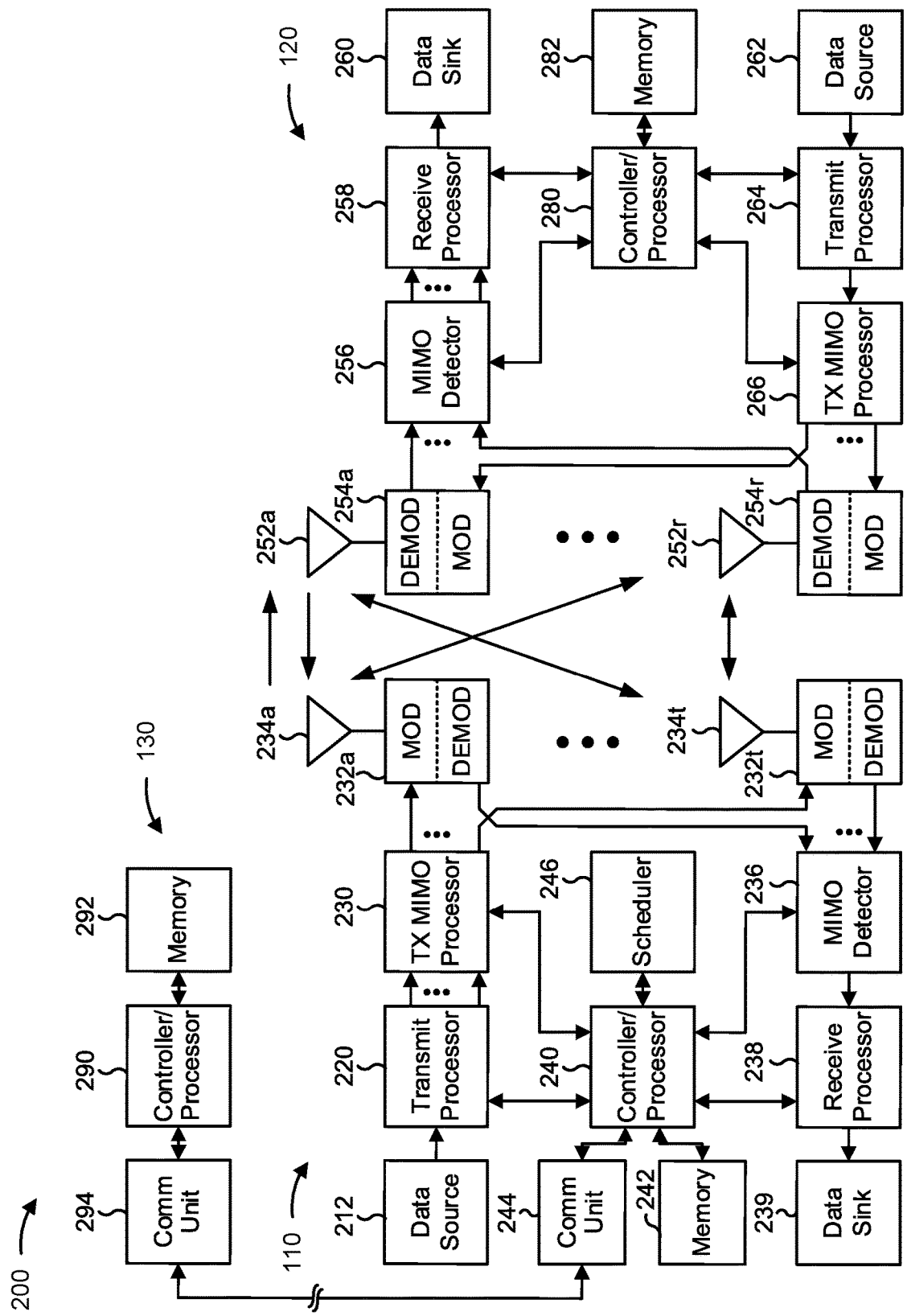
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring a user equipment based at least in part on a high speed train or tunneling (HSTT) event, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, process 1000 of FIG. 10, and/or other processes as described herein. A scheduler 246 may schedule UEs for data transmission on the downlink and/or uplink.

In some aspects, UE 120 may include means for determining a measurement of a wireless signal from a first base station of a network; means for determining that an HSTT event has occurred; means for providing, to the first base station, an indication that the HSTT event has occurred; means for receiving, from the first base station, configuration information; and/or the like. The measurement may comprise one or more of a Doppler shift of the wireless signal or an angular variation of the wireless signal. UE 120 may determine that an HSTT event has occurred based at least in part on one or more of the Doppler shift satisfying a Doppler shift threshold, the angular variation satisfying an angular variation threshold, and/or the like. The configuration information may be to configure UE 120 for a handover to a second base station of the network based at least in part on the HSTT event, configure UE 120 for beam switching based at least in part on the HSTT event, cause UE 120 to change a connection state based at least in part on the HSTT, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication that an HSTT event has occurred; means for providing, to the UE, configuration information; and/or the like. The configuration information may be to configure the UE for a handover to a second base station of the network based at least in part on the HSTT event, configure the UE for beam switching based at least in part on the HSTT event, cause the UE to change a connection state based at least in part on the HSTT, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for determining that an HSTT event has occurred and means for providing, to a UE, configuration information; and/or the like. Base station 110 may determine that an HSTT event has occurred based at least in part on one or more of satisfaction of a Doppler shift threshold by a Doppler shift measurement, by base station 110, of a wireless signal provided by the UE; satisfaction of an angular variation threshold by an angular variation measurement, by the UE, of the wireless signal provided by the UE; a position of the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
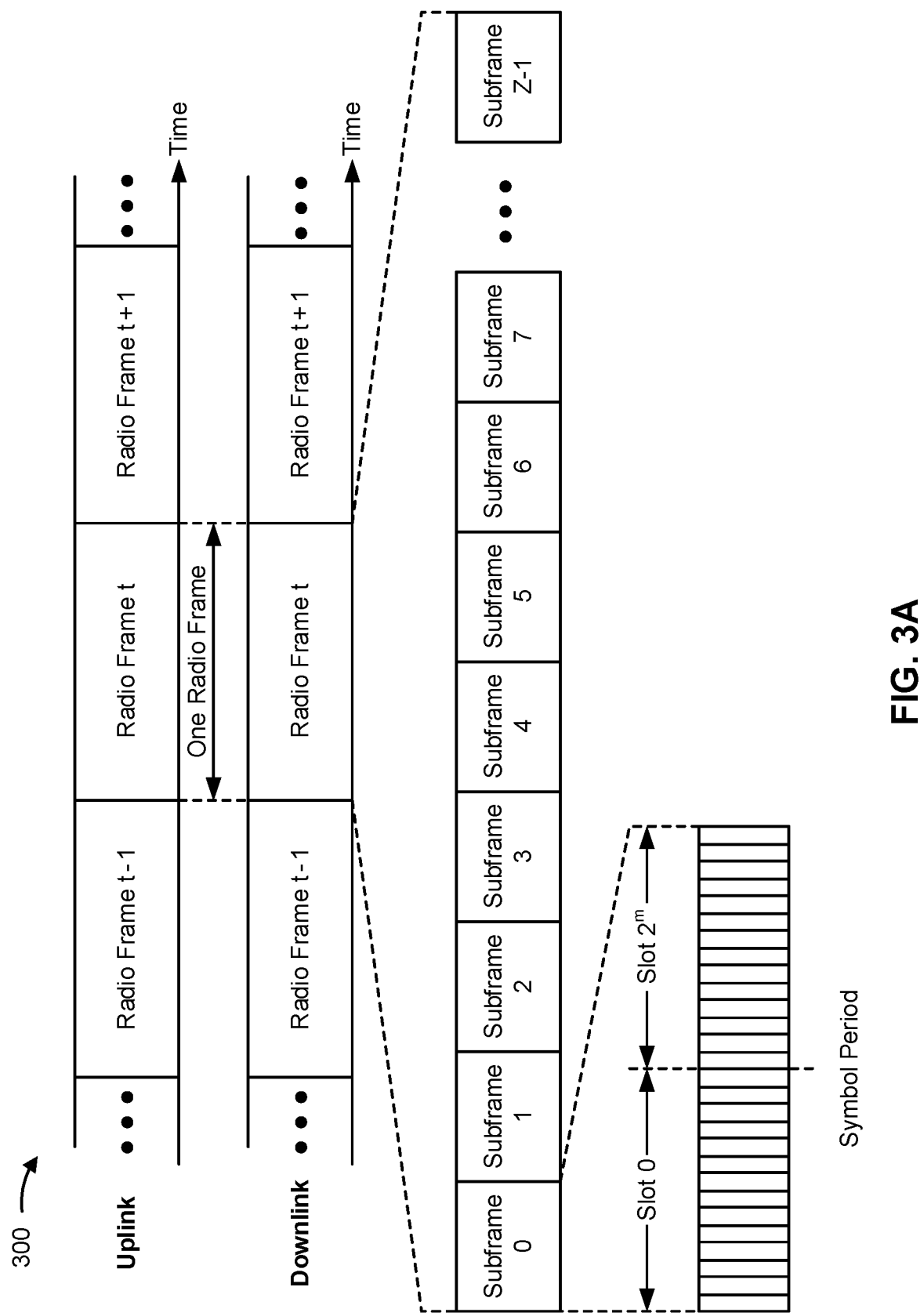
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
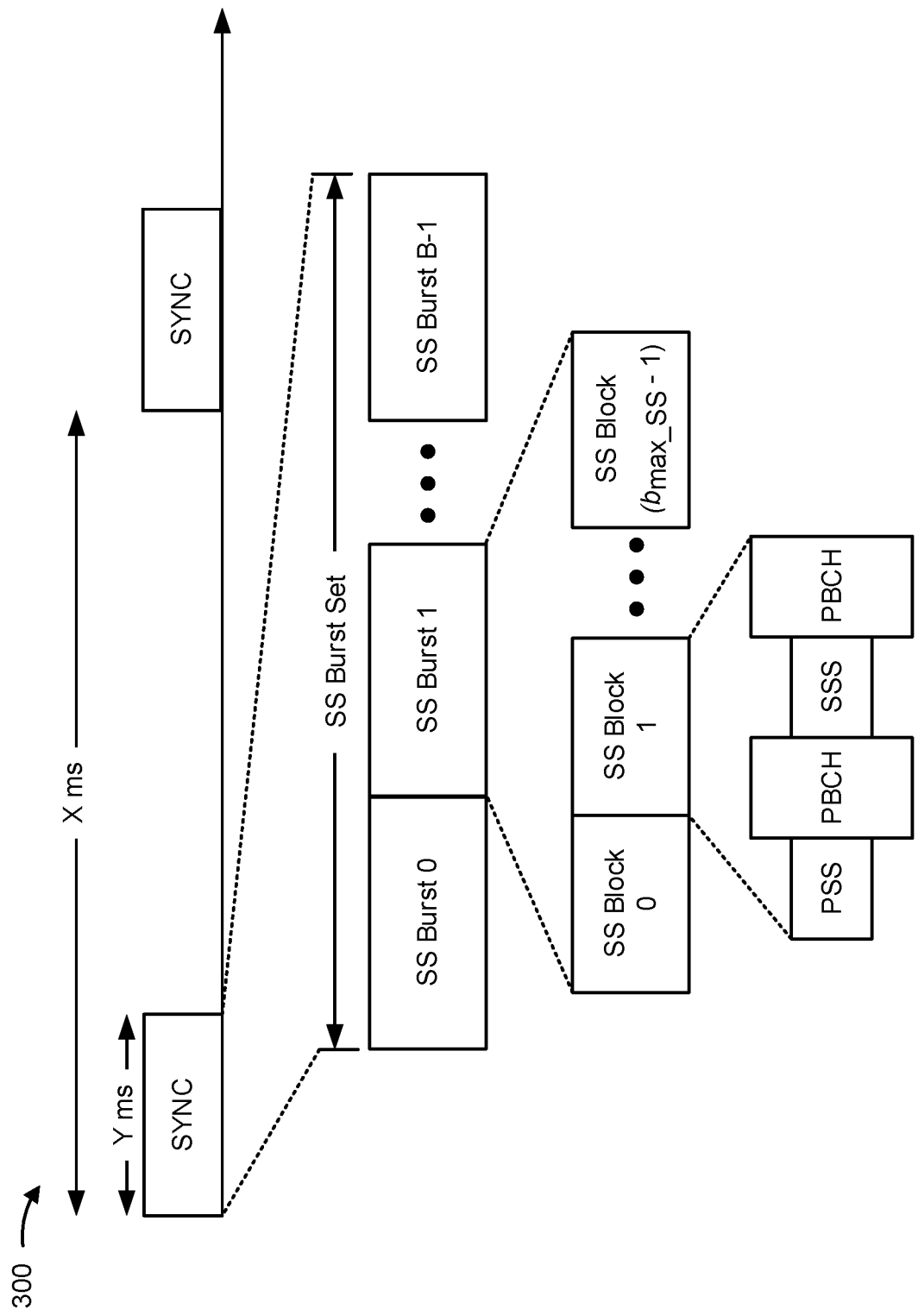
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
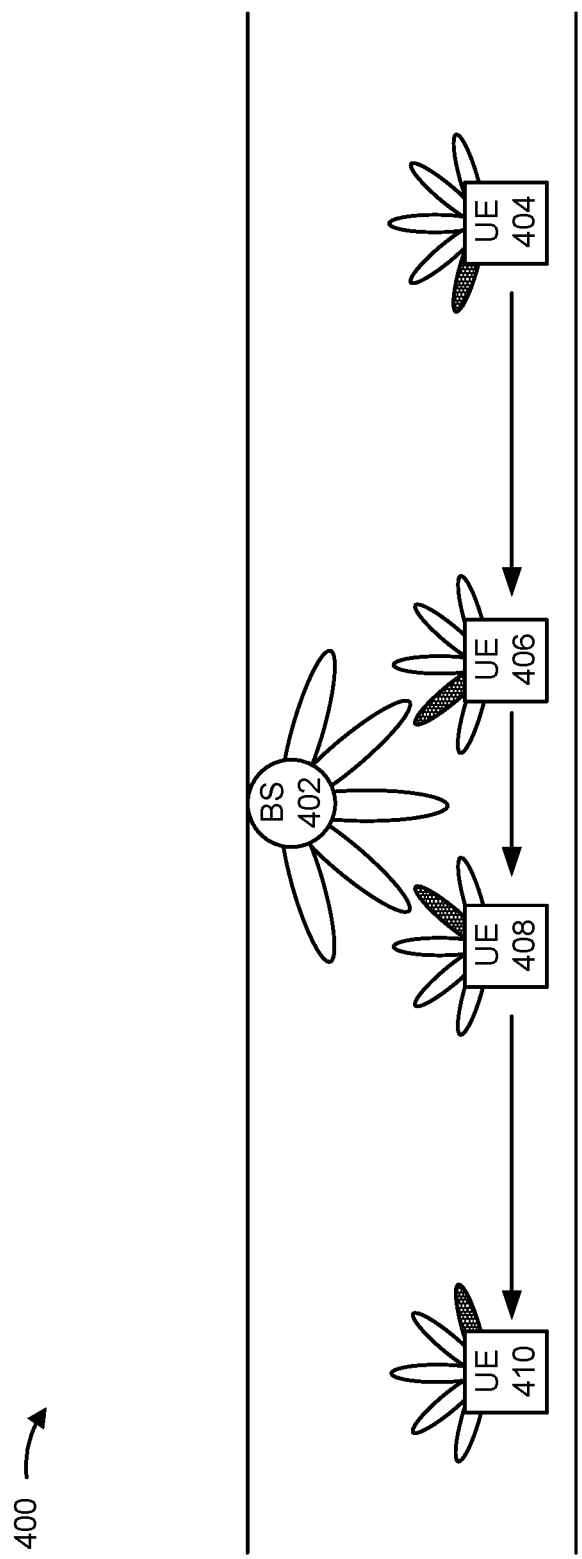
FIG. 4 is a diagram illustrating an example of user equipment in a high speed train or tunneling environment, in accordance with various aspects of the present disclosure.

FIG. 4 is a diagram illustrating an example 400 of UEs in a high speed train or tunneling environment, in accordance with various aspects of the present disclosure. FIG. 4 shows a base station 402 and UEs 404, 406, 408, 410 at various positions along a path of a high speed train or tunnel (HSTT) environment.

In an HSTT environment, base stations may provide a single frequency network in which multiple base stations transmit and receive communication signals on a single frequency (e.g., a single carrier) for improved frequency efficiency. However, base stations in an HSTT environment may be positioned along and/or close to a path of the HSTT. The base stations are to serve UEs in the HSTT environment in a linear path instead of a circular area. This can lead to increased Doppler shifts when UEs are relatively far from a base station (e.g., because UEs travel nearly directly toward or away from base stations in the HSTT environment), a large angular speed when UEs are relatively close to a base station, and/or the like.

UE 404 may have a relatively low angular variation, which may allow UE 404 to use a beam, for communicating with base station 402, with relatively reliability. Additionally, UE 404 may have a relatively high velocity (e.g., above 100 miles per hour) along the HSTT path, which is generally toward base station 402. The high velocity that is generally toward base station 402 may cause a relatively large and positive Doppler shift for wireless signals transmitted to and/or received from base station 402.

UE 406 may have a relatively high angular variation, based at least in part on UE 406 traveling at a position that is relatively close to base station 402 and/or based at least in part on UE 406 traveling with a relatively high velocity along the HSTT path. The relatively high angular variation may cause UE 406 to attempt to track and switch beams rapidly to maintain a connection with base station 402. However, measuring and responding to the relatively high angular variation may be difficult based at least in part on capabilities of the UE. For example, UE 406 may be unable to measure beams and then switch beams quickly enough to maintain a continuous connection with base station 402. Additionally, UE 406 may have a velocity in the direction of the HSTT path that is similar to the velocity of UE 404, but UE 406 is not moving in a direction that is generally toward base station 402. Because of this, a rate of change in a distance between UE 406 and base station 402 may be less than a rate of change in a distance between UE 404 and base station 402, which would result in a positive Doppler shift for communications of UE 406, though not as large of a positive Doppler shift as that of UE 404.

Similar to UE 406, UE 408 may have a relatively high angular variation, based at least in part on UE 408 traveling at a position that is relatively close to base station 402 and/or based at least in part on UE 408 traveling with a relatively high velocity along the HSTT path. Measuring and responding to the relatively high angular variation may difficult for UE 406. However, UE 408 may observe a deceleration of angular speed as it moves away from base station 402, which may stabilize beam selection and/or reduce demands for beam switching. UE 408 may have a high velocity along the HSTT path away from base station 402, with a rate of change of distance between UE 408 and base station 402 being less than a rate of change in distance between UE 410 and base station 402 because UE 410 is moving along the HSTT path in a direction that is generally away from base station 402. This means that the Doppler shift for UE 408 may be a negative Doppler shift for wireless signals transmitted to and/or received from base station 402, though not as large of a negative Doppler shift as that of UE 410.

Similar to UE 404, UE 410 may have a relatively low angular variation, which may allow UE 410 to use a beam, for communicating with base station 402, with reliability. Additionally, UE 404 may have a relatively high velocity (e.g., above 100 miles per hour) generally away from base station 402, which may cause a relatively large and negative Doppler shift for wireless signals transmitted to and/or received from base station 402.

With UEs traveling with a relatively high velocity along the HSTT path, UEs traveling between different positions shown by UEs 404, 406, 408, 410 may lose connections based at least in part on changes in Doppler shifts and angular variation. For example, a UE traveling between the position of UE 406 and the position of UE 408 may undergo a large change in Doppler shift (e.g., 1000 Hz or more) for signals transmitted to and/or received from base station 402. This large change in Doppler shift may result in losing a connection between a UE and base station 402 because the UE may not be able to perform frequency tracking quickly enough to maintain the connection through such a significant change in observed frequencies of wireless signals. Additionally, UEs traveling between the position of UE 406 and the position of UE 408 (e.g., at locations that are relatively close to base station 402 along an HSTT path) may lose connections with base station 402 because of a relatively high angular variation to which UEs may be unable to measure and respond based at least in part on a relatively high velocity and/or a proximity to base station 402.

In some aspects described herein, an HSTT event may be defined for wireless communication that, when identified, may cause a base station to provide configuration information to enable a UE to maintain a continuous connection between the UE and a single frequency network operating in the HSTT environment. The threshold may be based at least in part on capabilities of the UE (e.g., how quickly the particular UE is able to perform beam switching). In some aspects, the event may be identified based at least in part on a Doppler shift measurement, an angular variation measurement, a position of the UE, and/or the like. Conditions for the event and/or the configuration information to be provided to the UE may be defined by the network.

In some aspects, a UE may determine a measurement of a wireless signal from a first base station. The measurement may include one or more of a Doppler shift of the wireless signal or an angular variation of the wireless signal. The UE may determine that an HSTT event has occurred based at least in part on the Doppler shift satisfying a Doppler shift threshold or an angular variation satisfying an angular variation threshold. The Doppler shift threshold and/or the angular variation threshold may be defined by the network and/or based at least in part on capabilities of the UE. The UE may provide, to the first base station, an indication that the HSTT event has occurred. The indication may include indications of the measurement or may include an indication with the measurement. The first base station may determine configuration information to provide to the UE based at least in part on the indication of the HSTT and/or a location of the UE. The UE may receive the configuration information from the first base station. The configuration information may be used by the UE to configure the UE for a handover to a second base station, configure the UE for beam switching, or cause the UE to change a connection state based at least in part on the HSTT event.

In some aspects, a first base station may determine that an HSTT event has occurred based at least in part on satisfaction of a Doppler shift threshold by a Doppler shift measurement (e.g., by the first base station) of a wireless signal provided by a UE, satisfaction of an angular variation threshold by an angular variation measurement of the wireless signal provided by the UE, a position of the UE, and/or the like. The first base station may determine configuration information to provide to the UE based at least in part on the determined HSTT event and may provide the configuration information to the UE. The configuration information may be used to configure the UE for a handover to a second base station, configure the UE for beam switching, or cause the UE to change a connection state based at least in part on the HSTT event.

In this way, the first base station may cause the UE to be configured to account for Doppler shifts and/or angular variations that may occur in an HSTT environment. The base station may provide configuration information that may be used to increase a likelihood of maintaining a continuous connection with the network.

Figure 5:
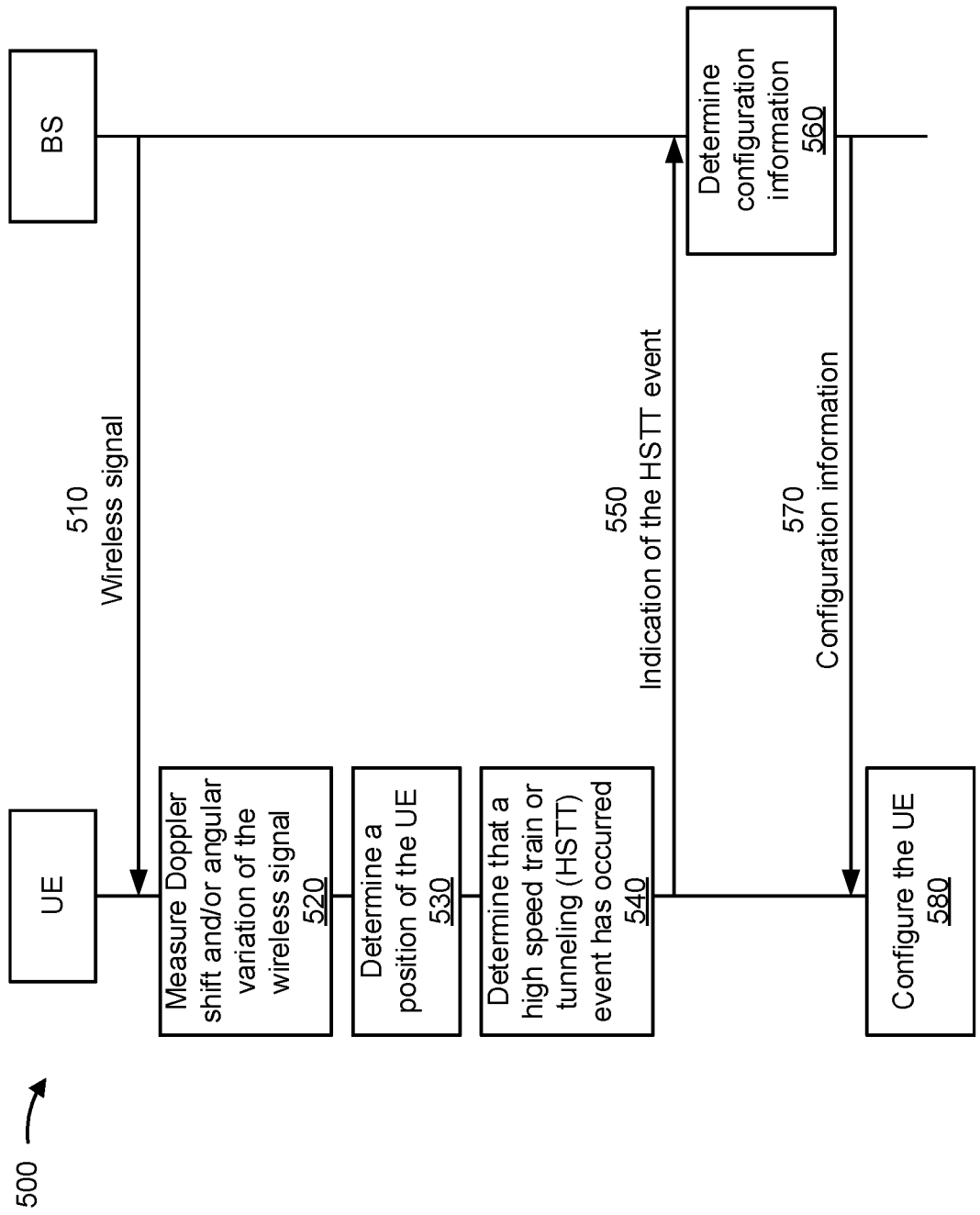
FIG. 5 is a diagram illustrating an example of configuring a user equipment based at least in part on a high speed train or tunneling event, in accordance with various aspects of the present disclosure.

FIG. 5 is a diagram illustrating an example 500 of configuring a user equipment based at least in part on a high speed train or tunneling event, in accordance with various aspects of the present disclosure. FIG. 5 shows a UE (e.g., UE 120) and a base station (e.g., base station 110).

As shown by reference number 510, the UE may receive a wireless signal from the base station. The wireless signal may be any wireless signal transmitted by the base station, such as a paging channel transmission, a PBCH transmission, a PDCCH transmission, a PDSCH transmission, a PSS, an SSS, and/or the like.

As shown by reference number 520, the UE may measure a Doppler shift, an angular variation, and/or the like from the wireless signal. The UE may measure a positive Doppler shift (e.g., a shift upwards in frequency), a negative Doppler shift, or no Doppler shift. The UE may measure a plurality of wireless signals to predict an upcoming change in Doppler shift. For example, the UE may measure a plurality of wireless signals to determine a prediction that the UE will soon observe a change in Doppler shift (e.g., from positive to negative as the UE passes the base station) in communications with the base station.

If the UE measures a positive Doppler shift, the UE may determine that the UE is traveling toward the base station. If the UE measures a negative Doppler shift, the UE may determine that the UE is traveling away from the base station. If the UE measures no Doppler shift (or nearly no Doppler shift), the UE may determine that the UE is not moving substantially or is traveling on a path that is generally orthogonal to a direct path between the base station and the UE. If the UE measures a series of positive Doppler shifts that are decreasing (e.g., exponentially decreasing), the UE may determine a prediction that the UE will soon observe a sharp change in Doppler shift (e.g., as the UE passes the base station).

As shown by reference number 530, the UE may determine a position of the UE. Positioning information to determine the position of the UE may include geographical coordinates, relative positioning with respect to the base station (e.g., a distance between the UE and the base station), and/or the like. The position of the UE may indicate that the UE is positioned along an HSTT path.

In some aspects, the UE may measure positioning information using capabilities of the UE (e.g., using a component of the UE such as a global positioning system device). In some aspects, the UE may receive positioning information from another device, such as the base station. For example, the base station may provide the positioning information via one or more of a radio resource control (RRC) communication, a downlink control information (DCI) communication, a medium access control (MAC) control element (CE) communication, and/or the like.

As shown by reference number 540, the UE may determine that an HSTT event has occurred. In some aspects, the HSTT event may indicate that a change in Doppler shift has passed. In some aspects, the HSTT event may indicate that a change in Doppler shift is expected and/or predicted by the UE based at least in part on the measurements of the wireless signal, the position of the UE, and/or the like.

In some aspects, the UE may determine that the HSTT event has occurred based at least in part on one or more thresholds that are provided by the network and/or the base station. In some aspects, the UE may determine that the HSTT event has occurred based at least in part on one or more thresholds related to capabilities of the UE (e.g., an amount of frequency variation that the UE can tolerate for received wireless signals, frequency tracking capabilities of the UE, beam switching capabilities, and/or the like). In some aspects, one or more thresholds for determining that the HSTT event has occurred are based at least in part on capabilities of the UE and information provided by the network (e.g., definitions of thresholds based on measurements and capabilities of the UE).

In some aspects, the UE may determine that the HSTT event has occurred based at least in part on the Doppler shift satisfying a Doppler shift threshold, the angular variation satisfying an angular variation threshold, a position of the UE, and/or the like. For example, the UE may determine the Doppler shift threshold and the angular variation threshold and may determine that the HSTT event has occurred based at least in part on satisfaction of one or both of the Doppler shift threshold or the angular variation threshold.

As shown by reference number 550, the UE may provide an indication of the HSTT event to the base station. In some aspects, indication of the HSTT event includes an indication of one or more measurements of the wireless signal to the base station. In some aspects, the UE provides an indication that the HSTT event has occurred without the one or more measurements of the wireless signal. In some aspects, the indication that the HSTT event has occurred includes an indication of a position of the UE.

As shown by reference number 560, the base station may determine configuration information for the UE based at least in part on the HSTT event. In some aspects, the base station may determine the configuration based at least in part on positions of one or more additional base stations. The base station may determine that the UE will soon observe a change in Doppler shift or an angular variation if the UE attempts to maintain a connection with the base station using a current beam. The base station may determine that a different beam and/or a base station positioned ahead or behind the UE on the HSTT path are better suited to maintain a continuous connection between the network and the UE.

In some aspects, the configuration information may be determined to configure the UE for a handover to a second base station of the network, configure the UE for beam switching, cause the UE to change a connection state, and/or the like based at least in part on the HSTT event. The configuration information may indicate to configure the UE immediately, based at least in part on the configuration information, or to prepare to configure the UE at a defined time (e.g., after a defined amount of time, at a particular time, at a particular frame, and/or the like). For example, the configuration information may indicate a multi-step process of beam switching to allow the UE to perform beam switching as the UE approaches and/or passes by the base station. Additionally, or alternatively, the configuration may indicate when to begin communicating with another base station to avoid losing a connection with the network and/or may indicate when to switch back to using the base station (e.g., after passing by the base station).

As shown by reference number 570, the UE may receive the configuration information from the base station. In some aspects, the UE may receive the configuration information via a DCI communication, an RRC communication, a MAC CE communication, and/or the like.

As shown by reference number 580, the UE may configure the UE based at least in part on the configuration information. For example, the UE may use the configuration information to configure the UE to communicate with a second base station (e.g., forward on the HSTT path, backward on the HSTT path, and/or the like) and/or to switch beams. In some aspects, the UE may configure the UE to change a communication state (e.g., from an idle mode to a connected mode) based at least in part on the configuration state. Once the UE has passed the base station, the UE may be configured to switch back to communicating with the base station (e.g., a closest base station).

In some aspects, the UE may be in an idle mode (e.g., idle mode connection state) or a discontinuous reception (DRX) mode. The UE may measure the Doppler shift and/or the angular variation of the wireless signal, a position of the UE, and/or the like while in the idle mode. The UE may determine that an HSTT event has occurred and may provide the indication of the HSTT event, determine to communicate with a second base station, communicate using a different beam, and/or the like. In some aspects, based at least in part on measurements of Doppler shift and/or the angular variation of the wireless signal, a position of the UE, and/or the like, the UE may determine to use a random access channel procedure to change from the idle mode or DRX mode to a connected mode.

The connected mode may cause the UE to communicate with the base station with relatively high frequency (e.g., higher frequency than when in the idle mode), which may assist the UE to maintain a continuous connection with the network while in the HSTT environment. For example, because the UE may be traveling with a relatively high velocity (e.g., 100 miles per hour or faster), infrequent communication, as when in the idle mode or the DRX mode, may cause the UE to be unable to reliably perform beam tracking and/or frequency tracking. This may cause the UE to fail to receive a page or other message that is intended for the UE. Changing from the idle mode or DRX mode to the connected mode may assist the UE in maintaining a continuous connection with the network (e.g., by providing indications of HSTT events and receiving configuration information from one or more base stations).

As indicated above, FIG. 5 is provided as an example. Other examples may differ from what is described with respect to FIG. 5.

Figure 6:
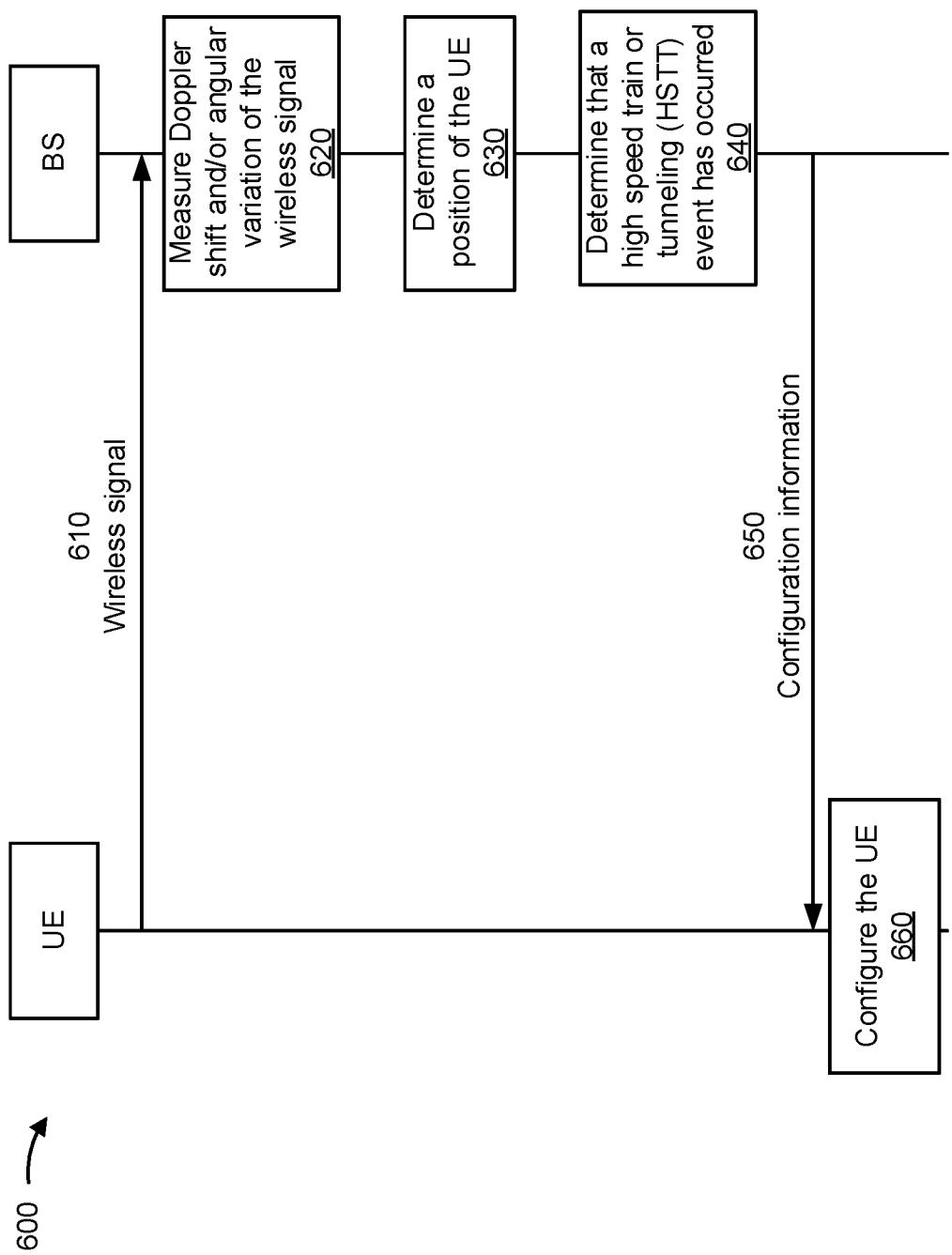
FIG. 6 is a diagram illustrating an example of configuring a user equipment based at least in part on a high speed train or tunneling event, in accordance with various aspects of the present disclosure.

FIG. 6 is a diagram illustrating an example 600 of configuring a user equipment based at least in part on a high speed train or tunneling event, in accordance with various aspects of the present disclosure. FIG. 6 shows a UE (e.g., UE 120) and a base station (e.g., base station 110).

As shown by reference number 610, the base station may receive a wireless signal from the UE. The wireless signal may include a physical uplink control channel (PUCCH) communication, a physical uplink share channel (PUSCH) communication, a physical random access channel (PRACH) communication, and/or the like.

As shown by reference number 620, the base station may measure a Doppler shift, an angular variation, and/or the like of the wireless signal. The base station may measure a positive Doppler shift (e.g., a shift upwards in frequency), a negative Doppler shift, or no Doppler shift. The base station may measure a plurality of wireless signals to predict an expected upcoming change in Doppler shift. For example, the base station may measure a plurality of wireless signals to determine a prediction that the UE and/or the base station will soon observe a change in Doppler shift (e.g., from positive to negative as the UE passes the base station) in communications with each other.

If the base station measures a positive Doppler shift, the base station may determine that the UE is traveling toward the base station. If the base station measures a negative Doppler shift, the base station may determine that the UE is traveling away from the base station. If the base station measures no Doppler shift (or nearly no Doppler shift), the base station may determine that the UE is not moving or is traveling on a path that is generally orthogonal to a direct path between the base station and the UE. If the base station measures a series of positive Doppler shifts that are decreasing (e.g., exponentially decreasing), the base station may determine a prediction that the UE will soon observe a sharp change in Doppler shift (e.g., as the UE passes the base station).

The base station may use the measurement of the Doppler shift, along with a direction of a beam used for communicating with the UE, to determine a direction in which the UE is traveling. Using the direction in which the UE is traveling, the base station may identify an additional base station that is forward on the HSTT path, an additional base station that is backward on the HSTT path, a beam that is likely to provide a better connection than a current beam based at least in part on the direction that the UE is traveling, and/or the like.

As shown by reference number 630, the base station may determine a position of the UE. The base station may determine the position of the UE based at least in part on signaling from the UE, based at least in part on a beam sweep process, information from another base station or another device on the network, and/or the like. As discussed in reference to FIG. 5, the position of the UE may include geographical coordinates of the UE, relative positioning with respect to the base station (e.g., a distance between the UE and the base station), and/or the like. The position of the UE may indicate that the UE is positioned along an HSTT path. Additionally, or alternatively, the base station may use the position of the UE along with the measurement of the Doppler shift to determine a direction that the UE is traveling along the HSTT path, to identify a base station as a forward base station, identify a base station as a backward base station, and/or the like.

As shown by reference number 640, the base station may determine that an HSTT event has occurred. In some aspects, the base station may determine that the HSTT event has occurred based at least in part on satisfaction of a Doppler shift threshold, satisfaction of an angular variation threshold, and/or a position of the UE. The occurrence of the HSTT may indicate that the base station expects an upcoming change in Doppler shift (e.g., a change that satisfies a threshold), that a change in Doppler shift has passed, that the base station expects an upcoming change in angular variation (e.g., a change that satisfies a threshold), that a change in angular variation has passed, that the UE is in a location associated with an HSTT environment, and/or the like.

As shown by reference number 650, the base station may provide the configuration information to the UE. In some aspects, the base station may provide the configuration within a DCI communication, an RRC communication, a MAC CE communication, and/or the like.

As shown by reference number 660, the UE may configure the UE based at least in part on the configuration information. As described above, the UE may use the configuration information to configure the UE to communicate with a second base station and/or to switch beams. In some aspects, the UE may configure the UE to change a communication state (e.g., from an idle mode to a connected mode) based at least in part on the configuration information.

As discussed above, the UE may be in an idle mode. The base station may determine that an HSTT event has occurred for the UE. For example, the base station may measure the Doppler shift and/or the angular variation of the wireless signal, a position of the UE, and/or the like to determine that the HSTT event has occurred for the UE. In some aspects, the base station may determine that an HSTT event has occurred (e.g., that the UE is in an HSTT environment)

based at least in part on the base station serving UEs in the HSTT environment. In some aspects, positioning information of the UE may be synchronized with the base station (e.g., via direct or indirect wireless communication).

The base station may provide configuration information to the UE to change a connection state of the UE from an idle mode to a connected mode. Once in the connected mode, the UE may perform one or more procedures described herein for maintaining a continuous connection with the network.

As indicated above, FIG. 6 is provided as an example. Other examples may differ from what is described with respect to FIG. 6.

Figure 7:
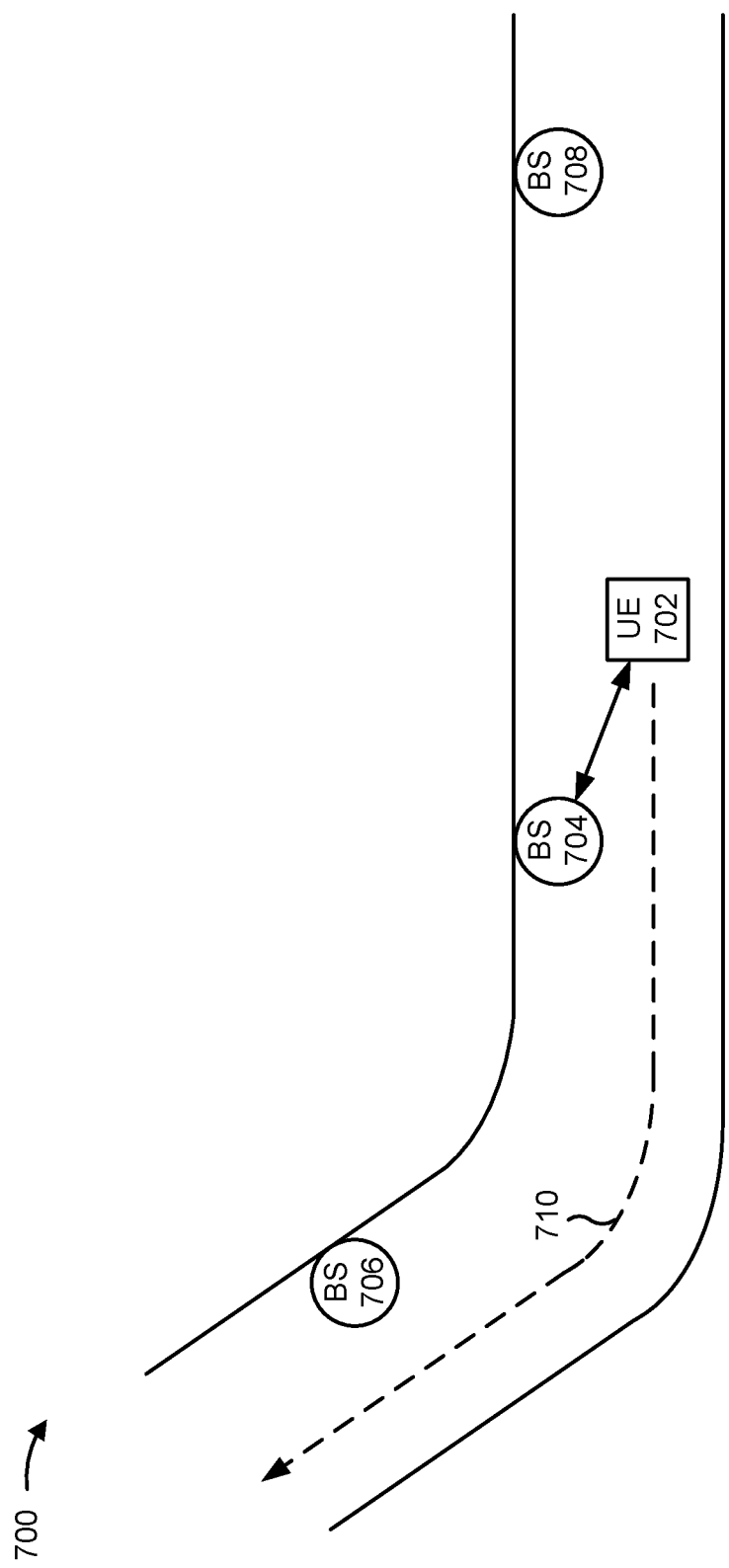
FIG. 7 is a diagram illustrating an example of a user equipment in a high speed train or tunneling environment, in accordance with various aspects of the present disclosure.

FIG. 7 is a diagram illustrating an example 700 of user equipment in a high speed train or tunneling environment, in accordance with various aspects of the present disclosure. FIG. 7 shows a UE 702, base stations 704, 706, and 708 at various positions along a path of a high speed train or tunnel (HSTT) environment, and an HSTT path 710.

As shown, UE 702 is connected with base station 704 for communicating with the network. In accordance with various aspects of the present disclosure, UE 702 may determine that an HSTT event has occurred (e.g., one or more measurements of a Doppler shift and/or an angular variation indicates that an upcoming change in a Doppler shift and/or angular variation is expected). For example, as UE 702 approaches base station 704, the Doppler shift may decrease toward no Doppler shift and an angular variation may increase as UE 703 rapidly moves between beams for communicating with base station 704.

Before traveling to a position that may be too close to base station 704 to maintain a continuous connection with the network via base station 704, UE 702 may provide an indication of an HSTT event to base station 704. Base station 704 may determine configuration information to provide to UE 702, as discussed herein, and provide the configuration information to UE 702.

In some aspects, the configuration information may identify a base station or a beam to use for communicating with the network. For example, the configuration information may indicate that UE 702 should communicate with base station 706 that is forward on the HSTT path 710 (a forward base station). Switching from base station 704 to base station 706 may allow UE 702 to communicate with the network without as sharp of a change in Doppler shift and/or in angular variation as if the UE were to continue to communicate with base station 704.

In some aspects, UE 702 may be unable to communicate with a base station that is forward on the HSTT path 710 (e.g., based at least in part on an obstruction such as a wall). In this case, base station 704 may provide configuration information to UE 702 to communicate with base station 708 that is backward on the HSTT path 710 (a backward base station).

In some aspects, after UE 702 has switched to communicating with base station 706 or 708, the UE may be configured (e.g., based at least in part on the configuration information or new configuration information) to switch back to communicating with base station 704. In some aspects, after passing base station 704, UE 702 may be able to communicate with base station 704 without an expected upcoming Doppler shift or increase in angular variation that might render UE 102 unable to maintain a continuous connection. For example, if UE 702 is configured to communicate with base station 708 while UE 702 passes by the base station 704, UE 702 may be configured to switch back to communicating with base station 704 based at least in part on base station 704 being a closest base station to UE 702 and/or based at least in part on having a strongest signal for UE 702.

In some aspects, if UE 702 is configured to communicate with base station 706 or 708, and UE 702 is unable to communicate with base station 706 or 708 (e.g., if a signal strength is low, if a Doppler shift is too large, and/or the like), UE 702 may switch back to communicating with base station 704.

Figure 8:
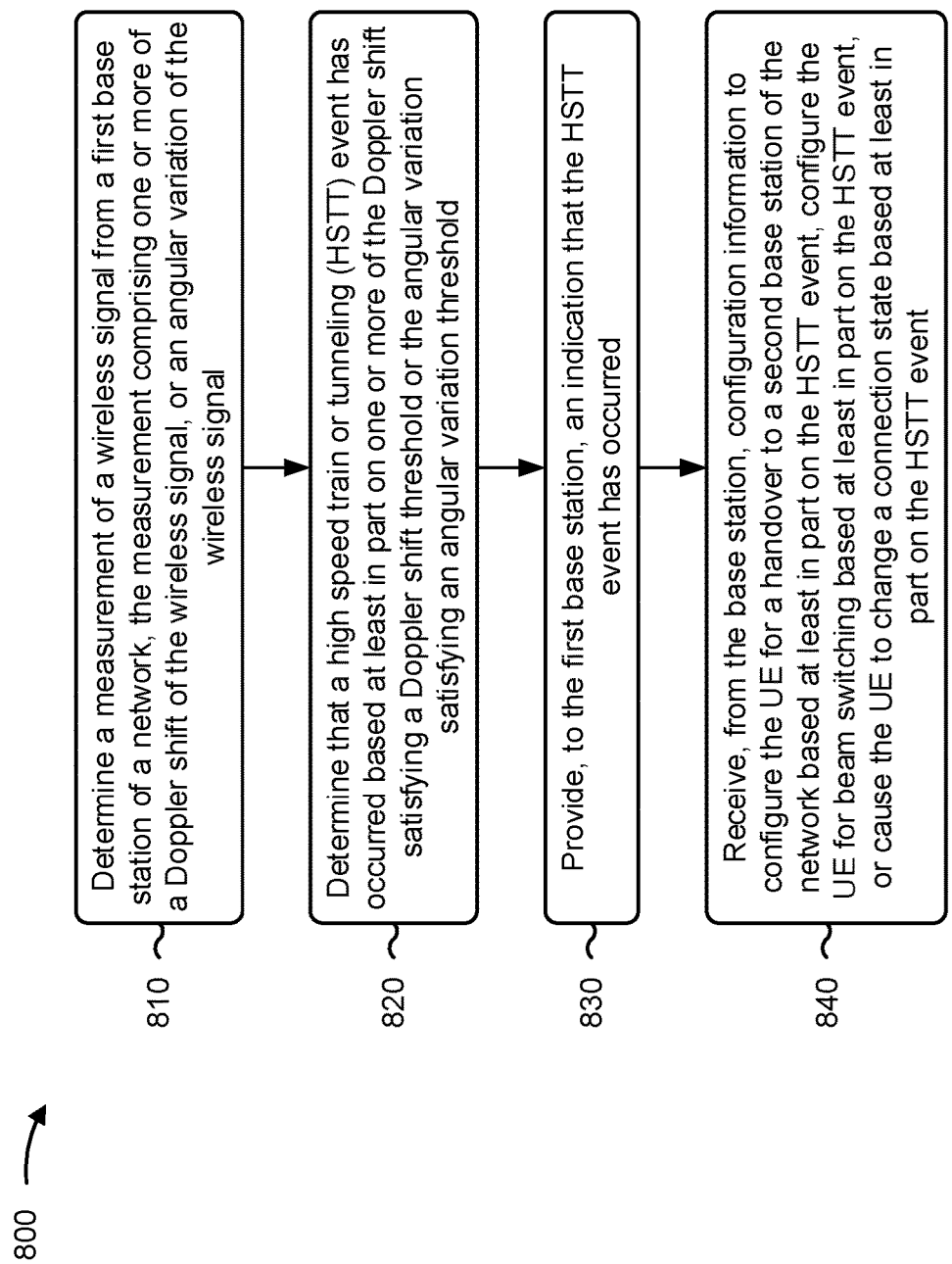
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with maintaining a continuous connection for a single frequency network.

As shown in FIG. 8, in some aspects, process 800 may include determining a measurement of a wireless signal from a first base station of a network, the measurement comprising one or more of: a Doppler shift of the wireless signal, or an angular variation of the wireless signal (block 810). For example, the UE (e.g., using receive processor 258, transmit processor 264, controller/processor 280, memory 282, and/or the like) may determine a measurement of a wireless signal from a first base station of a network, the measurement comprising one or more of a Doppler shift of the wireless signal, or an angular variation of the wireless signal, as described above.

As further shown in FIG. 8, in some aspects, process 800 may include determining that a high speed train or tunneling (HSTT) event has occurred based at least in part on one or more of: the Doppler shift satisfying a Doppler shift threshold, or the angular variation satisfying an angular variation threshold (block 820). For example, the UE (e.g., using receive processor 258, transmit processor 264, controller/processor 280, memory 282, and/or the like) may determine that an HSTT event has occurred based at least in part on one or more of the Doppler shift satisfying a Doppler shift threshold, or the angular variation satisfying an angular variation threshold, as described above.

As further shown in FIG. 8, in some aspects, process 800 may include providing, to the first base station, an indication that the HSTT event has occurred (block 830). For example, the UE (e.g., using receive processor 258, transmit processor 264, controller/processor 280, memory 282, and/or the like) may provide, to the first base station, an indication that the HSTT event has occurred, as described above.

As further shown in FIG. 8, in some aspects, process 800 may include receiving, from the first base station, configuration information to: configure the UE for a handover to a second base station of the network based at least in part on the HSTT event, configure the UE for beam switching based at least in part on the HSTT event, or cause the UE to change a connection state based at least in part on the HSTT event (block 840). For example, the UE (e.g., using receive processor 258, transmit processor 264, controller/processor 280, memory 282, and/or the like) may receive, from the first base station, configuration information to configure the UE for a handover to a second base station of the network based at least in part on the HSTT event, configure the UE for beam switching based at least in part on the HSTT event, or cause the UE to change a connection state based at least in part on the HSTT event, as described above.

Process 800 may include additional aspects, such as any single aspect or any combination of aspects described below and/or in connection with one or more other processes described elsewhere herein.

In a first aspect, process 800 includes configuring the UE based at least in part on the configuration information.

In a second aspect, alone or in combination with the first aspect, process 800 includes determining a position of the UE, wherein determining that the HSTT event has occurred is further based at least in part on the position of the UE.

In a third aspect, alone or in combination with one or more of the first and second aspects, determining the position of the UE comprises measuring position information by a component of the UE.

In a fourth aspect, alone or in combination with one or more of the first through third aspects, determining the position of the UE comprises receiving position information from the first base station.

In a fifth aspect, alone or in combination with one or more of the first through fourth aspects, receiving position information comprises receiving the position information via one or more of a radio resource control communication, a downlink control information communication, or a medium access control control element communication.

In a sixth aspect, alone or in combination with one or more of the first through fifth aspects, determining the position of the UE comprises determining a distance from the UE to the first base station.

In a seventh aspect, alone or in combination with one or more of the first through sixth aspects, the HSTT event indicates an expected upcoming change in the Doppler shift.

In an eighth aspect, alone or in combination with one or more of the first through seventh aspects, the HSTT event indicates that a change in the Doppler shift has passed.

In a ninth aspect, alone or in combination with one or more of the first through eighth aspects, the indication that the HSTT event has occurred comprises one or more of an indication of the measurement or an indication of a position of the UE.

In a tenth aspect, alone or in combination with one or more of the first through ninth aspects, the Doppler shift threshold is based at least in part on a UE capability to accept frequency variation that is based at least in part on the Doppler shift.

In an eleventh aspect, alone or in combination with one or more of the first through tenth aspects, the angular variation threshold is based at least in part on a beam switching capability of the UE.

In a twelfth aspect, alone or in combination with one or more of the first through eleventh aspects, the configuration information includes an identification of the second base station of the network for the handover.

In a thirteenth aspect, alone or in combination with one or more of the first through twelfth aspects, the configuration information includes an identification of a beam for the beam switching.

In a fourteenth aspect, alone or in combination with one or more of the first through thirteenth aspects, receiving the configuration information comprises receiving the configuration information via one or more of a radio resource control communication, a downlink control information communication, a medium access control control element communication, a physical broadcast channel communication, or a physical downlink control channel communication.

In a fifteenth aspect, alone or in combination with one or more of the first through fourteenth aspects, the UE is in an idle mode and the configuration information causes the UE to change to a connected mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
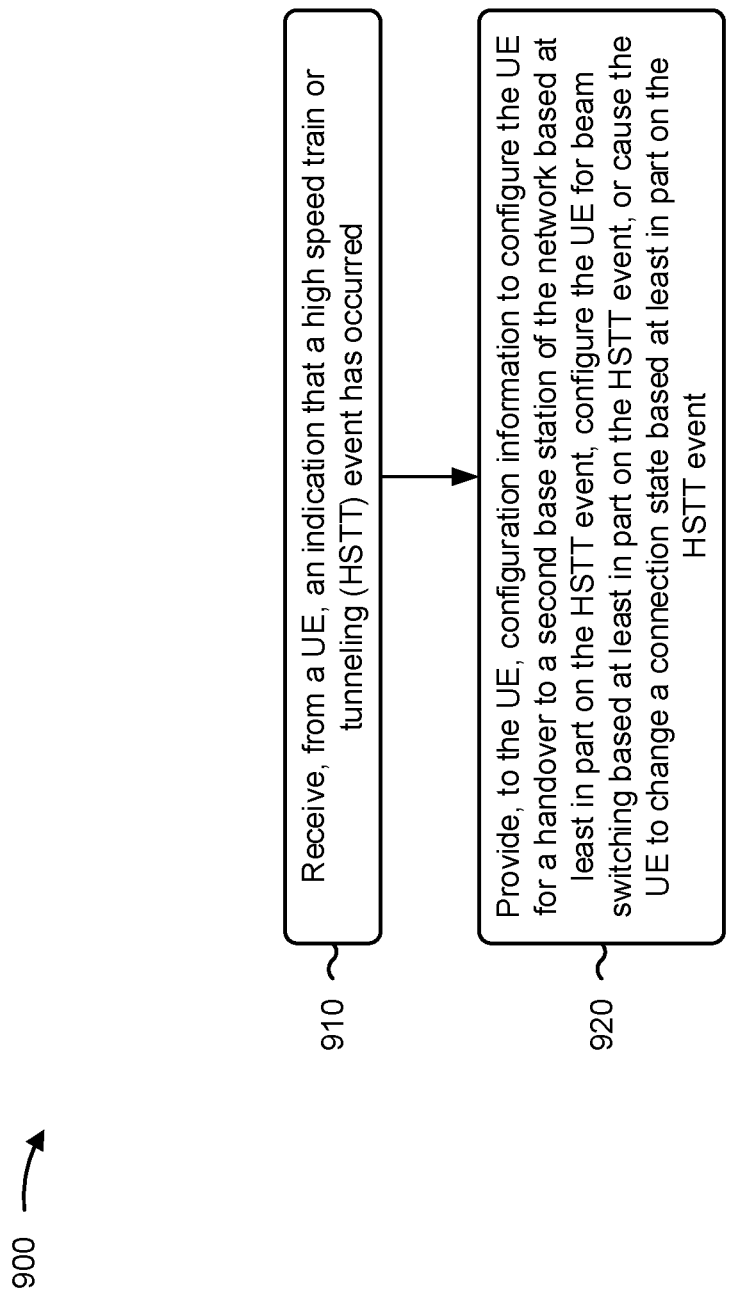
FIG. 9 is a diagram illustrating an example process performed, for example, by a network entity, in accordance with various aspects of the present disclosure.

FIG. 9 is a diagram illustrating an example process 900 performed, for example, by a first base station, in accordance with various aspects of the present disclosure. Example process 900 is an example where the first base station (e.g., base station 110 and/or the like) performs operations associated with maintaining a continuous connection for a single frequency network.

As shown in FIG. 9, in some aspects, process 900 may include receiving, from a UE, an indication that an HSTT event has occurred (block 910). For example, the first base station (e.g., using receive processor 238, transmit processor 220, controller/processor 240, memory 242, and/or the like) may receive, from a UE, an indication that an HSTT event has occurred, as described above.

As further shown in FIG. 9, in some aspects, process 900 may include providing, to the UE, configuration information to: configure the UE for a handover to a second base station of the network based at least in part on the HSTT event, configure the UE for beam switching based at least in part on the HSTT event, or cause the UE to change a connection state based at least in part on the HSTT event (block 920). For example, the first base station (e.g., using receive processor 238, transmit processor 220, controller/processor 240, memory 242, and/or the like) may provide, to the UE, configuration information to configure the UE for a handover to a second base station of the network based at least in part on the HSTT event, configure the UE for beam switching based at least in part on the HSTT event, or cause the UE to change a connection state based at least in part on the HSTT event, as described above.

Process 900 may include additional aspects, such as any single aspect or any combination of aspects described below and/or in connection with one or more other processes described elsewhere herein.

In a first aspect, process 900 includes determining a position of the UE, and determining the configuration information based at least in part on the position of the UE.

In a second aspect, alone or in combination with the first aspect, determining the position of the UE comprises measuring position information by a component of the first base station.

In a third aspect, alone or in combination with one or more of the first and second aspects, determining the position of the UE comprises receiving position information from the UE.

In a fourth aspect, alone or in combination with one or more of the first through third aspects, determining the position of the UE comprises determining a distance from the UE to the first base station.

In a fifth aspect, alone or in combination with one or more of the first through fourth aspects, the HSTT event indicates an expected upcoming change in a Doppler shift for communications with the UE.

In a sixth aspect, alone or in combination with one or more of the first through fifth aspects, the HSTT event indicates that a change in a Doppler shift, for communications with the UE, has passed.

In a seventh aspect, alone or in combination with one or more of the first through sixth aspects, the indication that HSTT event has occurred comprises one or more of an indication of a measurement, by the UE, of a wireless signal from the first base station, the measurement comprising one or more of a Doppler shift of the wireless signal, or an angular variation of the wireless signal; or an indication of a position of the UE.

In an eighth aspect, alone or in combination with one or more of the first through seventh aspects, the indication that the HSTT event has occurred indicates one or more of: satisfaction of a Doppler shift threshold by a Doppler shift measurement, by the UE, of a wireless signal provided by the first base station, or satisfaction of an angular variation threshold by an angular variation measurement, by the UE, of the wireless signal provided by the first base station.

In a ninth aspect, alone or in combination with one or more of the first through eighth aspects, the configuration information includes an identification of the second base station of the network for the handover.

In a tenth aspect, alone or in combination with one or more of the first through ninth aspects, the configuration information includes an identification of a beam for the beam switching.

In an eleventh aspect, alone or in combination with one or more of the first through tenth aspects, providing the configuration information comprises providing the configuration information via one or more of: a radio resource control communication, a downlink control information communication, a medium access control control element communication, a physical broadcast channel communication, or a physical downlink control channel communication.

In a twelfth aspect, alone or in combination with one or more of the first through eleventh aspects, the UE is in an idle mode.

In a thirteenth aspect, alone or in combination with one or more of the first through twelfth aspects, process 900 includes receiving, from the UE, a random access channel communication requesting to change to a connected mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
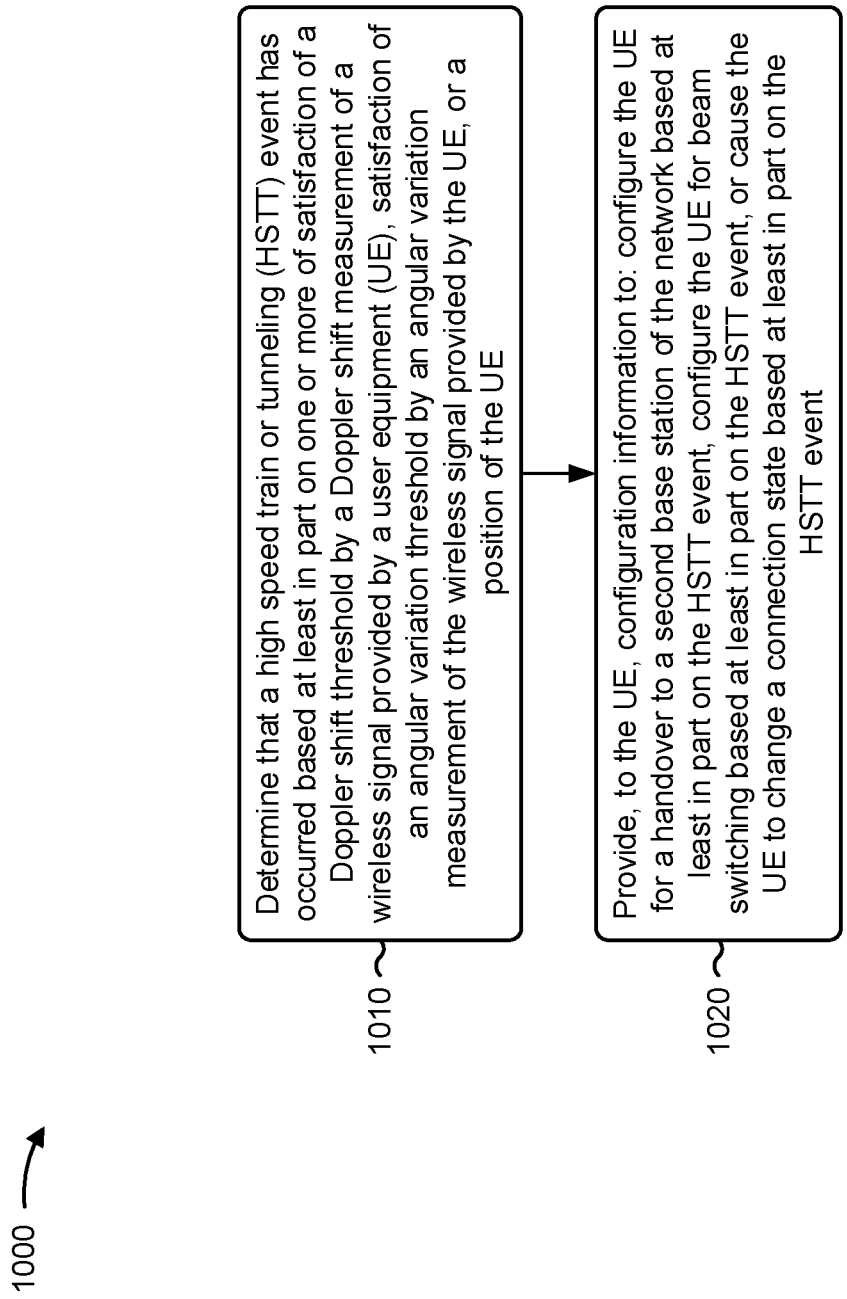
FIG. 10 is a diagram illustrating an example process performed, for example, by a network entity, in accordance with various aspects of the present disclosure.

FIG. 10 is a diagram illustrating an example process 1000 for example, by a first base station, in accordance with various aspects of the present disclosure. Example process 900 is an example where the first base station (e.g., base station 110 and/or the like) performs operations associated with maintaining a continuous connection for a single frequency network.

As shown in FIG. 10, in some aspects, process 1000 may include determining that an HSTT event has occurred based at least in part on one or more of: satisfaction of a Doppler shift threshold by a Doppler shift measurement of a wireless signal provided by a UE, satisfaction of an angular variation threshold by an angular variation measurement of the wireless signal provided by the UE, or a position of the UE (block 1010). For example, the first base station (e.g., using receive processor 238, transmit processor 220, controller/processor 240, memory 242, and/or the like) may determine that an HSTT event has occurred based at least in part on one or more of satisfaction of a Doppler shift threshold by a Doppler shift measurement of a wireless signal provided by a UE, satisfaction of an angular variation threshold by an angular variation measurement of the wireless signal provided by the UE, or a position of the UE, as described above.

As further shown in FIG. 10, in some aspects, process 1000 may include providing, to the UE, configuration information to: configure the UE for a handover to a second base station of the network based at least in part on the HSTT event, configure the UE for beam switching based at least in part on the HSTT event, or cause the UE to change a connection state based at least in part on the HSTT event (block 1020). For example, the first base station (e.g., using receive processor 238, transmit processor 220, controller/processor 240, memory 242, and/or the like) may provide, to the UE, configuration information to configure the UE for a handover to a second base station of the network based at least in part on the HSTT event, configure the UE for beam switching based at least in part on the HSTT event, or cause the UE to change a connection state based at least in part on the HSTT event, as described above.

Process 1000 may include additional aspects, such as any single aspect or any combination of aspects described below and/or in connection with one or more other processes described elsewhere herein.

In a first aspect, process 1000 includes determining a position of the UE, and determining the configuration information based at least in part on the position of the UE.

In a second aspect, alone or in combination with the first aspect, process 1000 includes determining the position of the UE by measuring position information by a component of the first base station.

In a third aspect, alone or in combination with one or more of the first and second aspects, process 1000 includes determining the position of the UE by receiving position information from the UE.

In a fourth aspect, alone or in combination with one or more of the first through third aspects, the position of the UE comprises a position relative to the first base station.

In a fifth aspect, alone or in combination with one or more of the first through fourth aspects, the HSTT event indicates an expected upcoming change in the Doppler shift.

In a sixth aspect, alone or in combination with one or more of the first through fifth aspects, the HSTT event indicates that a change in the Doppler shift has passed.

In a seventh aspect, alone or in combination with one or more of the first through sixth aspects, the configuration information includes an identification of the second base station of the network for the handover.

In an eighth aspect, alone or in combination with one or more of the first through seventh aspects, process 1000 includes determining that the UE is moving away from the second base station.

In a ninth aspect, alone or in combination with one or more of the first through eighth aspects, process 1000 includes determining that the UE is moving toward the second base station.

In a tenth aspect, alone or in combination with one or more of the first through ninth aspects, the configuration information includes an identification of a beam for the beam switching.

In an eleventh aspect, alone or in combination with one or more of the first through tenth aspects, providing the configuration information comprises providing the configuration information via one or more of a radio resource control communication, a downlink control information communication, a medium access control control element communication, a physical broadcast channel communication, or a physical downlink control channel communication.

In a twelfth aspect, alone or in combination with one or more of the first through eleventh aspects, the UE is in an idle mode and the configuration information is to cause the UE to change to a connected mode.

In a thirteenth aspect, alone or in combination with one or more of the first through twelfth aspects, process 1000 includes receiving, from the UE, a random access channel communication requesting to change to a connected mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
   determining, by the UE, a measurement of a wireless signal from a first base station of a network, the measurement comprising one or more of:
      a Doppler shift of the wireless signal, or
      an angular variation of the wireless signal;
   determining, by the UE, that a high speed train or tunneling (HSTT) event has occurred based at least in part on one or more of:
      the Doppler shift satisfying a Doppler shift threshold, or
      the angular variation satisfying an angular variation threshold;
   providing, by the UE and to the first base station, an indication that the HSTT event has occurred; and
   receiving, by the UE and from the first base station, configuration information to:
      configure the UE for a handover to a second base station of the network based at least in part on the HSTT event,
      configure the UE for beam switching based at least in part on the HSTT event, or
      cause the UE to change a connection state based at least in part on the HSTT event.

2. The method of claim 1, further comprising:
   configuring the UE based at least in part on the configuration information.

3. The method of claim 1, further comprising:
   determining a position of the UE,
      wherein determining that the HSTT event has occurred is further based at least in part on the position of the UE.

4. The method of claim 3, wherein determining the position of the UE comprises one or more of:
   measuring position information by a component of the UE,
   receiving position information from the first base station, or
   determining a distance from the UE to the first base station.

5. The method of claim 4, wherein receiving position information comprises:
   receiving the position information via one or more of:
      a radio resource control communication,
      a downlink control information communication, or
      a medium access control control element communication.

6. The method of claim 1, wherein the HSTT event indicates one or more of:
   an expected upcoming change in the Doppler shift, or
   that a change in the Doppler shift has passed.

7. The method of claim 1, wherein the indication that the HSTT event has occurred comprises one or more of:
   an indication of the measurement, or
   an indication of a position of the UE.

8. The method of claim 1, wherein the Doppler shift threshold is based at least in part on a UE capability to accept frequency variation that is based at least in part on the Doppler shift.

9. The method of claim 1, wherein the angular variation threshold is based at least in part on a beam switching capability of the UE.

10. The method of claim 1, wherein the configuration information includes one or more of:
   an identification of the second base station of the network for the handover, or
   an identification of a beam for the beam switching.

11. The method of claim 1, wherein receiving the configuration information comprises:
   receiving the configuration information via one or more of:
      a radio resource control communication,
      a downlink control information communication,
      a medium access control control element communication,
      a physical broadcast channel communication, or
      a physical downlink control channel communication.

12. The method of claim 1, wherein the UE is in an idle mode, and
   wherein the configuration information causes the UE to change to a connected mode.

13. A method of wireless communication performed by a first base station of a network, comprising:
   receiving, by the first base station, an indication that a high speed train or tunneling (HSTT) event has occurred for a user equipment (UE); and
   providing, by the first base station and for the UE, configuration information to:
      configure the UE for a handover to a second base station of the network based at least in part on the HSTT event,
      configure the UE for beam switching based at least in part on the HSTT event, or cause the UE to change a connection state based at least in part on the HSTT event.

14. The method of claim 13, further comprising:
   determining a position of the UE; and
   determining the configuration information based at least in part on the position of the UE.

15. The method of claim 14, wherein determining the position of the UE comprises one or more of:
   measuring position information by a component of the first base station,
   receiving position information from the UE, or
   determining a distance from the UE to the first base station.

16. The method of claim 13, wherein the HSTT event indicates one or more of:
   an expected upcoming change in a Doppler shift for communications with the UE, or
   that a change in the Doppler shift, for communications with the UE, has passed.

17. The method of claim 13, wherein the indication that the HSTT event has occurred comprises one or more of:
   an indication of a measurement, by the UE, of a wireless signal from the first base station, the measurement comprising one or more of:
      a Doppler shift of the wireless signal, or
      an angular variation of the wireless signal; or
      an indication of a position of the UE.

18. The method of claim 13, wherein the indication that the HSTT event has occurred indicates one or more of:
   satisfaction of a Doppler shift threshold by a Doppler shift measurement, by the UE, of a wireless signal provided by the first base station,
   satisfaction of an angular variation threshold by an angular variation measurement, by the UE, of the wireless signal provided by the first base station.

19. The method of claim 13, wherein the configuration information includes an identification of one or more of:
   the second base station of the network for the handover, or
   a beam for the beam switching.

20. The method of claim 13, wherein providing the configuration information comprises:
   providing the configuration information via one or more of:
      a radio resource control communication,
      a downlink control information communication,
      a medium access control control element communication,
      a physical broadcast channel communication, or
      a physical downlink control channel communication.

21. The method of claim 13, wherein the UE is in an idle mode, and
   wherein the configuration information is to cause the UE to change to a connected mode.

22. The method of claim 21, further comprising:
   receiving, from the UE, a random access channel communication requesting to change to the connected mode.

23. A method of wireless communication performed by a first base station of a network, comprising:
   determining, by the first base station, that a high speed train or tunneling (HSTT) event has occurred based at least in part on one or more of:
      satisfaction of a Doppler shift threshold by a measurement of a Doppler shift, by the first base station, of a wireless signal provided by a user equipment (UE),
      satisfaction of an angular variation threshold by an angular variation measurement, by the first base station, of the wireless signal provided by the UE, or
      a position of the UE; and
   providing, by the first base station and for the UE, configuration information to:
      configure the UE for a handover to a second base station of the network based at least in part on the HSTT event,
      configure the UE for beam switching based at least in part on the HSTT event, or
      cause the UE to change a connection state based at least in part on the HSTT event.

24. The method of claim 23, further comprising:
   determining the position of the UE; and
   determining the configuration information based at least in part on the position of the UE.

25. The method of claim 23, wherein determining the position of the UE comprises further comprising:
   determining the position of the UE by measuring position information by a component of the first base station, or
   determining the position of the UE by receiving position information from the UE.

26. The method of claim 23, wherein the position of the UE comprises a position relative to the first base station.

27. The method of claim 23, wherein the HSTT event indicates one or more of:
   an expected upcoming change in the Doppler shift, or
   that a change in the Doppler shift has passed.

28. The method of claim 23, wherein the configuration information includes an identification of the second base station of the network for the handover.

29. The method of claim 23, further comprising:
   determining that the UE is moving away from the second base station, or determining that the UE is moving toward the second base station.

30. The method of claim 23, wherein the configuration information includes an identification of a beam for the beam switching.

31. The method of claim 23, wherein providing the configuration information comprises:
providing the configuration information via one or more of:
a radio resource control communication,
a downlink control information communication,
a medium access control control element communication,
a physical broadcast channel communication, or
a physical downlink control channel communication.

32. The method of claim 23, wherein the UE is in an idle mode, and
wherein the configuration information is to cause the UE to change to a connected mode.

33. The method of claim 32, further comprising:
receiving, from the UE, a random access channel communication requesting to change to the connected mode.

34. A user equipment (UE) for wireless communication, comprising:
one or more memories; and
one or more processors coupled to the one or more memories, configured to:
determine, by the UE, a measurement of a wireless signal from a first base station of a network, the measurement comprising one or more of:
a Doppler shift of the wireless signal, or
an angular variation of the wireless signal;
determine, by the UE, that a high speed train or tunneling (HSTT) event has occurred based at least in part on one or more of:
the Doppler shift satisfying a Doppler shift threshold, or
the angular variation satisfying an angular variation threshold;
provide, by the UE and to the first base station, an indication that the HSTT event has occurred; and
receive, by the UE and from the first base station, configuration information to:
configure the UE for a handover to a second base station of the network based at least in part on the HSTT event,
configure the UE for beam switching based at least in part on the HSTT event, or
cause the UE to change a connection state based at least in part on the HSTT event.

35. A first base station of a network for wireless communication, comprising:
one or more memories; and
one or more processors, coupled to the one or more memories, configured to:
receive, by the first base station and from a user equipment (UE), an indication that a high speed train or tunneling (HSTT) event has occurred; and
provide, by the first base station and to the UE, configuration information to:
configure the UE for a handover to a second base station of the network based at least in part on the HSTT event,
configure the UE for beam switching based at least in part on the HSTT event, or
cause the UE to change a connection state based at least in part on the HSTT event.

* * * * *